Aug. 31, 1965   F. G. DE BRIE PERRY   3,203,267
INFINITELY VARIABLE CHANGE SPEED GEARS
Original Filed Aug. 17, 1960   2 Sheets-Sheet 1
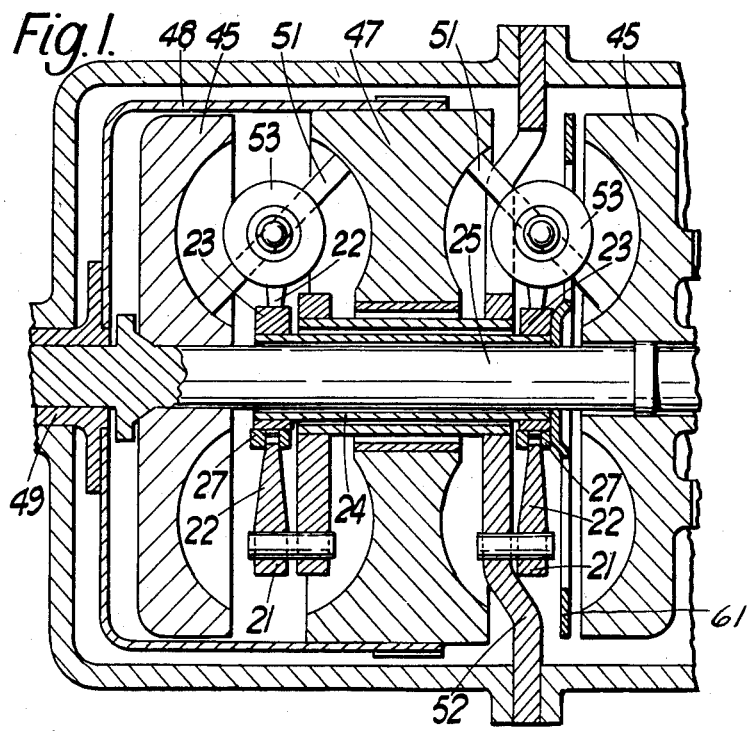
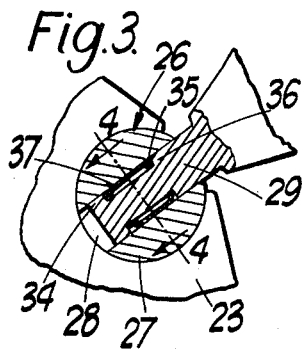
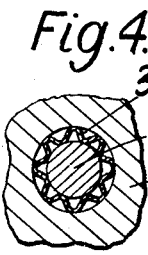
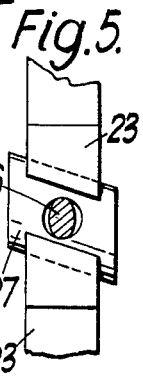
INVENTOR
Forbes George de Brie Perry
By Watson, Cole, Grindle & Watson
ATTORNEYS Aug. 31, 1965  F. G. DE BRIE PERRY  3,203,267
INFINITELY VARIABLE CHANGE SPEED GEARS
Original Filed Aug. 17, 1960  2 Sheets-Sheet 2
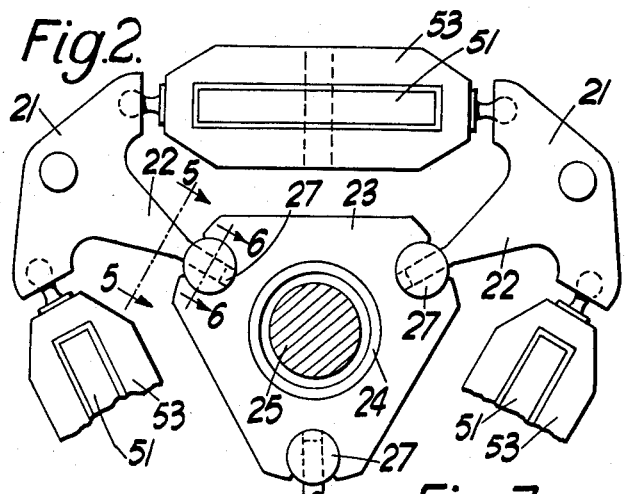
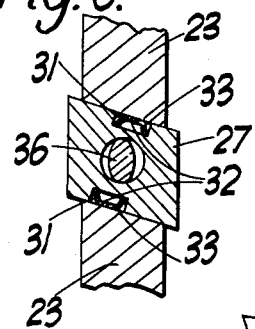
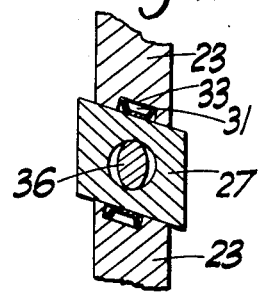
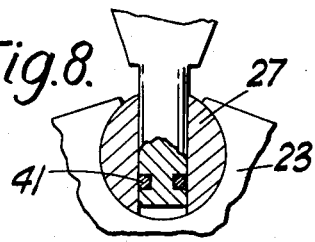
INVENTOR
Forbes George de Brie Perry
By Watson, Cole, Grindle & Watson
ATTORNEYS United States Patent Office 3,203,267
Patented Aug. 31, 1965

3,203,267
INFINITELY VARIABLE CHANGE
SPEED GEARS
Forbes George de Brie Perry, East Grinstead, Sussex, England, assignor to National Research Development Corporation, London, England, a British body corporate
Continuation of application Ser. No. 50,151, Aug. 17, 1960. This application Dec. 12, 1961, Ser. No. 160,694
Claims priority, application Great Britain, Aug. 19, 1959, 28,397/59
17 Claims. (Cl. 74—200)

This application is a continuation of my United States patent application No. 50,151 filed August 17, 1960 now abandoned.

This invention relates to infinitely variable change speed gears of the friction type having coaxial first and second torus discs spaced apart and drivably connected by a plurality of rollers, and means to tilt the axes of the rollers, which means comprises a cam and a plurality of rockers all controlled by the cam, said rockers each being pivotally carried by a torque reaction member of the gear to pivot about a pivot axis such that the rocker senses the torque reaction of a roller and the system tends to balance the torque reaction of all the rollers.

According to the present invention, there is provided such a construction of infinitely variable change speed gear in which each rocker has an arm extending into a cam slot in the cam with radial freedom between the cam and the rocker arm and at least one of the cam slots contains a guide member and is shaped to permit a relative movement axially of the slot between the cam and the guide member and to permit relative rotation about the axis of the slot between the cam and the guide member but to retain the guide member against relative movement between the cam and the guide member at right angles to the axis of the slot, and the end of the rocker arm extending into the slot is received with friction in the guide member.

According to a feature of the invention, the end of the rocker arm may be received within a bore in the guide member and friction means may be provided between the rocker arm and the guide member. Such friction means may comprise a resilient member abutting and compressed between the rocker arm and the wall of the bore and may for example be a metal spring member embracing the rocker arm and received within a circumferential slot in the rocker arm.

In constructions wherein the end of the rocker arm is received within a cylindrical bore in the guide member, a further feature of the invention provides that the rocker arm may have a portion which fits the cylindrical bore and be otherwise relieved so as to permit tilting between the rocker arm and the guide member in at least one direction.

According to yet another feature of the invention the gear may further comprise further friction means opposing relative axial motion between the rocker and the cam. In some constructions adopting this feature, the guide member may be mounted to move with the rocker arm relative to the cam and the further friction means may comprise a resilient member abutting and compressed between the guide member and the cam. Such a resilient member can be a metal spring member embracing the guide member and received within a slot in the guide member.

According to yet another feature of the invention, the cam slot and guide member may be cylindrical with the guide member fitting within the cam slot.

One embodiment of the invention will now be described by way of example with reference to the accompanying drawings, of which:

FIGURE 1 is an elevation showing a change speed gear,
FIGURE 2 is an elevation of part of the rocker gear and cam employed in the change speed gear of FIGURE 1,
FIGURE 3 is a scrap section through the end of a rocker arm and adjacent parts,
FIGURE 4 is a section on the line 4—4 of FIGURE 3,
FIGURE 5 is a section on the line 5—5 of FIGURE 2,
FIGURE 6 is a section on the line 6—6 of FIGURE 2,
FIGURE 7 is a section similar to FIGURE 6 but of a modified construction, and
FIGURE 8 is a scrap section similar to FIGURE 3, but of a modified construction.

In this embodiment the gear comprises two inwardly facing first torus discs 45 mounted on and driven by a drive shaft 25, a double outwardly facing second torus disc 47 connected by a drum 48 to an output shaft 49 and two assemblies of rollers 51, roller carriers 53 and rocker gear provided one between each first torus disc and the second torus disc. Each assembly comprises three rollers having their centres spaced 120° around an axis substantially conciding with the axis of the drive shaft.

Each rocker 21 is mounted to pivot on a torque-reaction member 52 of the gear and has a rocker arm 22 which extends into a cam slot cut in a rocker cam 23 mounted on a rocker cam sleeve 24 which surrounds the drive shaft 25 with radial clearance and limited axial and radial freedom of movement relative to the drive shaft. The rocker cam sleeve 24 is connected to a spider ring 61 at one end thereof. This spider ring forms part of a control means connected to move the rocker cam 23 about its axis in a manner well-known in the art, and more fully illustrated and described in the U.S. patent to Hayes 2,123,006 granted July 5, 1938.

Each cam slot 26 contains a guide member 27 which has a bore 28 extending transversely of the axis of the cam slot 26 and the end 29 of each rocker arm 22 is received within the bore 28 in a guide member 27.

The cam slots 26 are circular in section normal to their axis i.e. the direction in which they extend and the guide members 27 are cylindrical and fit in the cam slots 26. Each guide member 27 has a circumferential slot 31 extending around it (see FIGURE 6) from the ends of the bore and a C-shaped corrugated spring element 32 is received within the circumferential slot 31 so that it embraces the guide member 27 while leaving unobstructed the mouth of the bore facing out from the mouth of the cam slot.

The amplitudes of the corrugations of the spring member are such that, when it is unstressed, the crests of the corrugations project beyond the surface of the guide member. Thus the spring element has to be stressed in order to insert it into the cam slot and thereafter is compressed between the guide member 27 and the wall 33 of the cam slot 26 so that it generates friction when the cam 23 moves relative to the guide member 27.

The end 29 of each rocker arm which is received in the bore 28 of the guide member has a cylindrical land 34 at its tip and a recess 35 bounded at one end by the cylindrical land 34 and at the other end by the shank 36 of the rocker arm. The shank 36 of the rocker arm is relieved so that it is elliptical in cross-section and the depth of the land 34 is such that the end of the rocker arm can tilt in the direction of the minor axis of the ellipse relative to the guide member.

A corrugated spring ring 37 is received in the recess 35 of the rocker arm and the corrugations are of an amplitude such that the crests of the corrugations stand proud of the cylindrical surface of the land when the spring is unstressed. When the spring is received in the bore 28 of the guide member, the spring 37 is compressed between the rocker arm and the wall of the bore and thus causes friction to be generated if the rocker arm moves relative to the guide member along the bore.

One result of using the present invention in constructions of infinitely variable change speed gear, is that the friction generated by the spring members damps out any tendency which there may be to hunt when the rocker gear adjusts itself to equalize the torque transmitted by the rollers of the infinitely variable change speed gear. In some constructions this result may be obtained satisfactorily by causing friction when the rocker arm moves radially relative to the cam and it will be appreciated that, for instance, in gears having diametrically opposed rollers, it may be sufficient to generate friction between only one rocker arm and the cam.

It will also be appreciated that in the embodiment above described, the kind of springs and the material from which they are made should be chosen with regard to the service which they have to perform. For instance, if the gear is oil lubricated, it is desirable for the springs to be metal springs. If however the possibility of oil reaching the spring elements can be excluded, then the springs could be in the form of O-sectioned rubber rings.

It will be appreciated that a number of modifications can be made without departing from the scope of the invention. Two such modifications are illustrated in the drawings. In that illustrated in FIGURE 7 the recess for the spring 31 which embraces the guide member 27 is formed in the cam 23 instead of being formed in the guide member.

Again, as mentioned above, an actual form of spring employed can be chosen with a view to its best suiting the service which it has to carry out. For instance, for small gears a circlip as shown at 41 in FIGURE 8 is satisfactory instead of the corrugated springs above described.

I claim:
1. An infinitely variable change speed gear of the friction type having coaxial first and second torus discs spaced apart, a plurality of rollers drivably connecting the torus discs, a torque reaction member and means to tilt the axes of the rollers, which means comprises a cam and a plurality of rockers connected with the rollers and all controlled by the cam, said rockers each being pivotally carried by the torque reaction member to pivot about a pivot axis such that the rocker senses the torque reaction of a roller and the said means tends to balance the torque reaction of all the rollers characterised in that each rocker has an arm extending into a cam slot in the cam with radial freedom between the cam and the rocker arm and in that at least one of the cam slots contains a guide member which is shaped to permit a relative movement axially of the slot between the cam and the guide member and to permit relative rotation about the axis of the slot between the cam and the guide member but to retain the guide member against relative movement between the cam and the guide member at right angles to the axis of the slot, and in that the end of the rocker arm extending into the slot is received with friction in the guide member.

2. An infinitely variable change speed gear of the friction type having coaxial first and second torus discs spaced apart, a plurality of rollers drivably connecting the torus discs, a torque reaction member and means to tilt the axes of the rollers, which means comprises a cam and a plurality of rockers connected with the rollers and all controlled by the cam, said rockers each being pivotally carried by the torque reaction member to pivot about a pivot axis such that the rocker senses the torque reaction of a roller and the said means tends to balance the torque reaction of all the rollers characterised in that each rocker has an arm extending into a cam slot in the cam with radial freedom between the cam and the rocker arm and in that at least one of the cam slots contains a guide member which is shaped to permit a relative movement axially of the slot between the cam and the guide member and to permit relative rotation about the axis of the slot between the cam and the guide member but to retain the guide member against relative movement between the cam and the guide member at right angles to the axis of the slot, and in that the guide member is formed with a bore in which is received the end of the rocker arm, and friction means are provided between the rocker arm and the guide member.

3. In an infinitely variable change speed gear of the friction type comprising a pair of inwardly facing torus discs and a plurality of rollers drivably connecting the torus discs, means to tilt the axes of the rollers, which means include:
    (a) a cam having a plurality of cam slots,
    (b) a plurality of rockers connected to the rollers and each having a rocker arm; the said rocker arms engaging respectively in the cam slots,
    (c) in at least one cam slot, a guide member retained against movement at right angles to the axis of the slot but movable relative to the cam slot axially of the slot and about the axis of the cam slot; the guide member having a bore therein in which is received one of the said rocker arms, and
    (d) a resilient member abutting and being compressed between the rocker arm and the wall of the bore.

4. In an infinitely variable change speed gear of the friction type comprising a pair of inwardly facing torus discs and a plurality of rollers drivably connecting the torus discs; means to tilt the axes of the rollers, which means include:
    (a) a cam having a plurality of cam slots,
    (b) a plurality of rockers connected to the rollers and each having a rocker arm; the said rocker arms engaging respectively in the cam slots,
    (c) in at least one cam slot, a guide member retained against movement at right angles to the axis of the slot but movable relative to the cam slot axially of the slot and about the axis of the cam slot; the guide member having a bore therein in which is received the end of one of the said rocker arms which has a circumferential slot, and
    (d) a spring embracing the rocker arm and being received within the circumferential slot, the said spring being compressed between the said rocker arm and the wall of the bore.

5. In an infinitely variable change speed gear of the friction type comprising a pair of inwardly facing torus discs and a plurality of rollers drivably connecting the torus discs; means to tilt the axes of the rollers, which means include:
    (a) a cam having a plurality of cam slots,
    (b) a plurality of rockers connected to the rollers and each having a rocker arm; the said rocker arms engaging respectively in the cam slots,
    (c) in at least one cam slot, a guide member retained against movement at right angles to the axis of the slot but movable relative to the cam slot axially of the slot and about the axis of the cam slot; the guide member having a cylindrical bore therein in which is received one of the said rocker arms which said one rocker arm has a portion which fits the cylindrical bore of the guide member and is otherwise relieved so as to permit tilting between the rocker arm and the guide member in at least one direction, and
    (d) friction means between the rocker arm and the guide member.

6. An infinitely variable change speed gear of the friction type comprising a pair of inwardly facing torus discs; a plurality of rollers drivably connecting the torus discs; and means to tilt the axes of the rollers, which means include:
    (a) a cam having a plurality of cam slots,
    (b) a guide member in each cam slot, said guide member being retained against movement at right angles to the axis of the slot but being movable relative to the cam slot axially of the slot and about the axis of the cam slot; the guide members each having a bore therein, (c) a plurality of rockers connected to the rollers and each having a rocker arm; the said rocker arms being received respectively in said bores, and (d) a plurality of resilient members respectively abutting and being compressed between a rocker arm and the wall of the bore in which it is received.

7. In an infinitely variable change speed gear of the friction type comprising a pair of inwardly facing torus discs and a plurality of rollers drivably connecting the torus discs; means to tilt the axes of the rollers, which means include:

(a) a cam having a plurality of cam slots, (b) a plurality of rockers connected to the rollers and each having a rocker arm; the said rocker arms engaging respectively in the cam slots, (c) in at least one cam slot, a guide member having a bore therein in which is received one of the said rocker arms, and (d) a resilient member abutting and being compressed between the rocker arm and the wall of the bore.

8. An infinitely variable change speed gear as claimed in claim 1 comprising friction means opposing relative motion between the rocker and the cam.

9. An infinitely variable change speed gear as claimed in claim 8 wherein the guide member is mounted to move with the rocker arm relative to the cam and the friction means comprises a resilient member abutting and compressed between the guide member and the cam.

10. An infinitely variable change speed gear as claimed in claim 9 wherein the resilient member is a spring member embracing the guide member and received within a slot in the guide member.

11. An infinitely variable change speed gear as claimed in claim 1 wherein the cam slot and guide member are cylindrical with the guide member fitting within the cam slot.

12. An infinitely variable change speed gear of the friction type comprising:

(a) coaxial first and second torus discs spaced apart, (b) a plurality of rollers drivably connecting the torus discs, (c) a cam movable about the axis of the torus discs and movable radially relative to the said axis, (d) a plurality of rockers operatively connecting the cam to the rollers whereby the cam may control the rollers, (e) control means connected to the cam to move it about the said axis, and (f) damping means connected to the cam to dampen radial movement of the cam relative to the said axis.

13. An infinitely variable change speed gear of the friction type comprising:

(a) coaxial first and second torus discs spaced apart, (b) a plurality of rollers drivably connecting the torus discs, (c) a torque reaction member, (d) a cam movable about the axis of the torus discs and movable radially relatively to the said axis, (e) a plurality of rockers operatively connected to the rollers and having respectively rocker arms, the inner ends of which are connected to the cam with radial play, and (f) a plurality of friction means respectively connecting the cam to the inner ends of the rocker arms.

14. An infinitely variable change speed gear as claimed in claim 13 wherein the cam is provided with a plurality of slots which receive respectively the inner ends of the rocker arms and wherein the friction means each comprise a spring ring surrounding the said inner end of each of the rocker arms and being in frictional engagement therewith and with the associated slot.

15. An infinitely variable change speed gear as claimed in claim 13 wherein the cam is provided with a plurality of cam slots, there being further provided:

(a) a plurality of guide members carried respectively in the cam slots and each having a bore in which is received the inner end of an associated rocker arm, and, (b) a plurality of resilient members respectively within the said bores in the guide members, each resilient member being in frictional engagement with the wall of the bore and the inner end of the rocker arm received therein.

16. An infinitely variable change speed gear of the friction type comprising:

(a) three coaxial and spaced apart torus discs of which the outer torus discs have inwardly facing torus surfaces and the inner torus disc has two outwardly facing torus surfaces, (b) two sets of rollers respectively co-operating with the two facing pairs of torus surfaces, (c) a plurality of roller carriers carrying said rollers, (d) a pair of cams, one for each set of rollers, each cam having a plurality of cam slots therein, (e) a plurality of guide members received respectively within the cam slots and being axially movable relative to the cam slots but in a direction inclined to the axis of the torus discs, (f) two sets of rockers, the rockers being connected respectively to the rollers, (g) an inwardly directed rocker arm carried by each rocker, (h) a bore in each guide member receiving the inner end of an associated rocker arm, and (i) a plurality of friction means respectively acting between the cam slots and the guide members to damp axial movements of the guide members in the cam slots.

17. An infinitely variable change speed gear as claimed in claim 16 wherein the friction means comprises a spring embracing a guide member and bearing against the cam slot to dampen axial movements of the guide member in the cam slot.

References Cited by the Examiner

UNITED STATES PATENTS

| 1,986,264 | 1/35 | Hayes | 74—200 |
| 2,123,006 | 7/38 | Hayes | 74—200 |
| 2,124,399 | 7/38 | Hayes | 74—200 |

FOREIGN PATENTS 780,073   1/35   France.

DON A. WAITE, *Primary Examiner.*